United States Patent [19]
Webster

[11] Patent Number: 5,740,146
[45] Date of Patent: Apr. 14, 1998

[54] METHOD AND APPARATUS FOR REDUCING NOISE USING A PLURALITY OF RECORDING COPIES

[75] Inventor: Ronald L. Webster, Sagaponack, N.Y.

[73] Assignee: Disney Enterprises, Inc., Burbank, Calif.

[21] Appl. No.: 735,332

[22] Filed: Oct. 22, 1996

[51] Int. Cl.$^6$ .................................. G11B 3/64; G11B 5/86
[52] U.S. Cl. .............................. 369/107; 369/84; 369/85; 360/15
[58] Field of Search ............................... 369/84, 85, 107; 360/15

[56] References Cited

U.S. PATENT DOCUMENTS

| | | | |
|---|---|---|---|
| 4,186,280 | 1/1980 | Geiseler | 369/85 |
| 4,286,294 | 8/1981 | Nakauchi et al. | 360/27 |
| 4,410,917 | 10/1983 | Newdoll et al. | 369/84 |
| 4,410,970 | 10/1983 | Law | 369/58 |
| 4,851,931 | 7/1989 | Parker et al. | 360/15 |
| 5,021,893 | 6/1991 | Scheffler | 360/15 |
| 5,041,921 | 8/1991 | Scheffler | 369/85 |
| 5,097,461 | 3/1992 | Majima | 369/84 |
| 5,132,955 | 7/1992 | Hanson | 369/85 |
| 5,331,617 | 7/1994 | Fuma et al. | 369/84 |
| 5,365,381 | 11/1994 | Scheffler | 369/85 |
| 5,418,654 | 5/1995 | Scheffler | 369/85 |

*Primary Examiner*—David C. Nelms
*Assistant Examiner*—Kim-Kwok Chu
*Attorney, Agent, or Firm*—Hecker & Harriman

[57] ABSTRACT

The present invention provides a method for reducing noise using a plurality of recording copies. The present invention produces a master file with lower noise than the available recording copies, and avoids the problems of losing musical content caused by prior art pop and click removers. The system comprises a recording playback unit, a computer system with a sound input capability, and a high capacity storage system such as a CD recorder. In operation, a plurality of recording copies of a single recording are played on the playback unit. These recordings are digitized by the computer and a separate recording file is formed for each copy of the recording. The recording files are then synchronized. The samples from each of the recording files are then averaged to reduce the noise components. A variety of threshold comparison techniques can be employed to eliminate samples and/or recording files that are outside of a computed range for that sample based on the values of the master, the other slave files or a combination thereof.

27 Claims, 5 Drawing Sheets

METHOD AND APPARATUS FOR REDUCING NOISE USING A PLURALITY OF RECORDING COPIES

BACKGROUND OF THE INVENTION

1. Field of the Invention

This invention relates to the field of reducing noise in recordings, and more specifically to producing an improved master recording given a plurality of recording copies.

2. Background Art

Many phonograph records and other recordings that were produced before the advent of digital recording are now being converted to digital recordings. This process is straightforward but requires a "clean" copy of the original recording to be digitized. A clean copy is a copy that does not have scratches, pops, skips, hiss and other flaws that the listener does not want to hear. Currently there are no good solutions to digitizing a recording when there is no clean copy. This is most often the case with old records where the original recordings are lost or damaged. These records are said to contain unwanted audio noise.

To understand the sources of noise in old phonograph-type records, it is important to know something about how they are made. In producing phonograph records, electrical signals representative of sounds are used to vibrate a cutting tool which cuts a groove into a base material or so-called "lacquer" used to ultimately form a master record disc. The so-called "lacquer" is then nickel plated. Next, the lacquer is peeled off and the nickel plating becomes the master. Phonograph records, typically made of polyvinyl chloride, are then produced by using the master to imprint the grooves onto a blank record. To play back a phonograph record a needle, called a stylus, is placed in a groove. The rotation of the record causes the stylus to contact contours in the grooves and vibrate accordingly. These vibrations are amplified and thereby reproduce the recorded sound. The friction between the stylus and the groove contours gradually distorts the shapes of the contours and thus degrades the sound quality of the recording. In addition to this inherent source of noise, dust and other contaminants may become embedded in records. This dust then changes the shape of the groove contours in the record and produces noise. Other noise sources include scratches in the recording medium and warping of the recording medium caused, for example, by exposure to a heat source. The noise may sound like pops and clicks in the recording, white noise, or a general reduction in the clarity of the sound. A "pop" is a high level noise across a wide range of frequencies, whereas a "click" is a high frequency, high level noise. White noise is random noise that has a constant energy per unit bandwidth at every frequency in the range of interest. White noise may sound like a background fuzzy hiss on a recording.

A method and apparatus is needed to reduce the audible noise content of analog sound recordings, particularly phonograph type records. Digital recording technology provides high quality low noise recordings. One widely used medium for digital recording is the compact disc. Compact discs store music in the form of a series of bits. Reflected light from a laser beam is used to read the bits, which are then converted back into analog signals to play back the recording. Because a laser is used to read the information from the compact disc, there is no degradation of the recording medium caused by physical contact with the recording medium as is the case with tape players and turntables. The highly accurate digitization process used in recording compact discs combined with the absence of any mechanical degradation of the recording medium during playback are important features that have led to the popularity of the compact disc. The high fidelity audio reproduction afforded by compact discs has also caused widespread dissatisfaction with the noise levels of older analog recordings.

For many old recordings, a master recording is no longer available. All that remains may be several copies of the recording that have been heavily used for many years. For example, often radio station announcers apologize for playing a low quality early jazz recording, but explain their selection on the grounds that no re-release exists. These old recordings are likely to have substantial noise components caused by the accumulation of contaminants, scratches and groove contour degradation from the playback process. Traditional techniques to remove the pops and clicks from records detrimentally affect the sound quality of the recording. For example, generally click and pop removers are designed to operate using only one copy of a recording; therefore, they cannot restore recording content that is no longer there. Consequently, these systems typically leave empty gaps in the recording where the pops or clicks were. The limitations of prior art noise reducing systems discourage record companies from re-releasing old recordings where there is no master recording. Thus, for old recordings where a master is not available, a system is needed to reduce the noise in the recordings, that does not create gaps in the recordings, and avoids the other problems of the prior art.

References related to sound recording and recording quality enhancement include the following:

In U.S. Pat. No. 4,410,970 Law discloses a method and apparatus for identifying the frequency bands and the time of occurrence of "ticks and pops" on a record. Law isolates the times and frequencies at which ticks and pops occur on a number of records. Law focuses on obtaining a profile of noise across several records. In other words, Law focuses on determining which frequency bands have the highest number ticks and pops, and the times at which the largest number of ticks and pops occur. If the ticks and pops are limited to a certain frequency band or a certain time interval, the ticks and pops are results of defects in the master recording. On the other hand, if the ticks and pops are randomly distributed, they are due to reasons other than a defective master. For example, they can be a result of faults in the recording material.

In U.S. Pat. No. 4,186,280 Geiseler discloses restoration of old sound recordings. Old recordings having a musical part, such as a singing voice, a solo instrument and a formant, are restored. The old recording is played back with the production of an electrical acoustic signal. The amplitude of the acoustic signal is enhanced in frequency ranges which correspond to the formants of the musical part.

In U.S. Pat. No. 5,132,955 Hanson discloses a method and apparatus for synchronizing multiple CD players. Sampling frequencies are inputted to the word clock inputs of the CD players. Each of the disks has a header disposed at the beginning of each program track. This header has a synchronization signal that indicates the position of the output digital data. The synchronization signal thus indicates the difference between positions of the different CD players. A controller then uses this information to synchronize the CD players.

In U.S. Pat. No. 4,851,931 Parker discloses a method and apparatus for converting an analog audio signal into a digital audio signal and thereafter converting the digital audio signal into a video signal, thereby significantly compressing the original analog audio signal. The video signal can be written onto a video disk or a video tape.

In U.S. Pat. No. 5,021,893 Scheffler discloses a recording duplicating system. The analog audio signals from the master recording are converted to digital signals and stored in a buffer. The "duplication ratio" can be any value permitted by the recording and reproducing machines. Set up procedures to switch from one to another duplicating ratio are thus eliminated.

In U.S. Pat. Nos. 5,041,921; 5,365,381; and 5,418,654 Scheffler discloses a custom album recording system. A master library has a number of recorded items from sources such as phonograph records, tapes, and compact discs. Each recorded item has its own address. An operator selects certain recorded items by selecting their addresses. The selected items are written onto a large capacity memory and from the large capacity memory are written at a high speed onto an album size medium, such as a cassette tape. A computer provides both analog-to-digital and digital-to-analog conversions as needed.

In U.S. Pat. No. 4,410,917 Newdoll discloses a method and apparatus for recording information from a master medium onto a slave medium. Analog information from a master medium is reproduced and converted to digital form. The digital data is stored in a digital storage device. The digital data is recovered from the digital storage device and recorded onto the slave medium at a rate that is higher than the rate of recording information in analog form directly from the master medium onto the slave medium. Accordingly, the time to duplicate analog information from the master medium onto the slave medium is reduced.

In U.S. Pat. No. 4,286,294 Nakauchi discloses a recording and reproducing system for a recording medium where the recording and reproducing head moves relative to the recording medium. Nakauchi's system reduces wow and flutter that is produced when the recording medium moves at a low speed. This is accomplished by generating a sampling signal whose frequency varies depending upon the amount of wow and flutter caused by the relative motion of the recording medium.

In addition to the above references related to sound recording, image processing systems exist that correlate related images to reduce the noise in the images. For example, the "ZEISS"™ "DSM-960" scanning electron microscope can average multiple frames to reduce the noise in an image. These systems are typically designed for subject matter that does not change between frames. These systems generally do not have any means for correlating subject matter from frames that are not aligned.

SUMMARY OF THE INVENTION

The present invention provides a method and apparatus for reducing noise using a plurality of copies of a recording. The present invention produces a master file with lower noise than the available recording copies, and avoids the problems of losing musical content caused by prior art pop and click removers. The system comprises a recording playback unit, a computer system with a sound input capability, and a high capacity storage system such as a CD recorder.

In operation, a plurality of copies of a single recording are played on the playback unit. For example, three records of an early jazz recording. These recordings are digitized by the computer and a separate recording file is formed for each copy of the recording. The starting points of each of the recording files are then aligned. The computer searches the recording file to find the first instance of a music profile and defines that as a preliminary marker for the start of the recording file. The computer or operator selects one recording file to be a master recording based on a preliminary determination of which file has the lowest noise content. The other files are slave files.

To precisely align the recording files the computer evaluates the alignment of a group of samples. In one embodiment, the standard deviation of the difference between corresponding master and slave samples is calculated using the preliminary identification of the starting positions of the recording files as an initial alignment. Corresponding samples are those samples located at the same point in time in the respective recording copies as measured by the current synchronized alignment of the recording files. The slave file is then shifted in time relative to the master file and the standard deviation of the difference of the re-aligned samples is then computed. This process of shifting the files in time and computing the standard deviation of the difference is then repeated. This alignment process is repeated throughout the noise reduction process at predetermined intervals.

The general principle of the noise reduction processes is that by comparing the different recording copies the musical signals can be distinguished from the noise, and the noise can then be reduced. There are a large number of statistical processes that can be used to reduce the noise in a recording using a plurality of recording copies, including: averaging, calculating standard deviations, calculating mode values, and performing threshold comparisons.

One embodiment of the noise reducing system of the present invention uses an averaging process to reduce the level of white noise. Because white noise is random the phase of the noise in different recording files at any given sample location is likely to be different. The computer uses this phase difference between the noise components of corresponding samples in different recording files to reduce the noise level by averaging the signals.

Numerous enhancements may be made to the averaging process to further improve noise reduction. In one embodiment, as a preliminary step, the system eliminates recording files that have unacceptably poor sound quality relative to the other recording files. At the start of the averaging process for a given sample, the computer obtains the value of the selected sample from each of the recording files. The computer then calculates the average of those values. The computer may next eliminate sample values that exceed a predetermined threshold difference from the average value. Alternatively, the computer may eliminate the recording file, or a predetermined number of recording files, that differ the most from the average. In one embodiment, where there is a large number of recording files, for example over ten, the computer determines the threshold by calculating the standard deviation of the error between each recording sample and the average signal level. The computer then eliminates the recording files with an error greater than a predetermined multiple of the standard deviation.

Alternatively, the computer may eliminate unacceptably noisy recording files based on the standard deviation of the difference between the master and slave samples. In another enhancement to the averaging process, the computer approximates the signal-to-noise ratio based on general properties of white noise, pops and clicks. The computer may then eliminate any recording files that have a signal-to-noise ratio below a given threshold. Also if samples from particular recording files are repeatedly found to have unacceptably high noise levels, the computer may eliminate the entire recording file from the process. A further enhancement to the averaging process is eliminating a predetermined number of samples after a pop or click is detected.

This process of eliminating recording file samples based on variations between recording file sample values reduces pops and clicks as well as white noise. In contrast to prior art pop and click removal systems, the present invention noise reducing system avoids the problem of losing musical content when a pop or click is eliminated because the present invention uses the samples from the other recording copies for the output file in place of the recording file samples corrupted by pop and click noise.

BRIEF DESCRIPTION OF THE DRAWINGS

FIG. 3 illustrates time shifting files in a synchronization process of the present invention.

FIG. 4 illustrates a noise averaging process of the present invention.

DETAILED DESCRIPTION OF THE INVENTION

The present invention is directed to a method and apparatus for reducing noise using a plurality of recording copies. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

The present invention produces a master file with lower noise than the available recording copies, and avoids the problems of losing musical content caused by prior art pop and click removers. The system comprises a recording playback unit, a computer system with a sound input capability, and a high capacity storage system such as a CD recorder. In operation, a plurality of recording copies of a single recording are played on the playback unit. These recordings are digitized by the computer and a separate recording file is formed for each copy of the recording. The recording files are then synchronized. The samples from each of the recording files are then averaged to reduce the noise components. A variety of threshold comparison techniques can be employed to eliminate samples and/or recording files that are outside of a computed range for that sample based on the values of the master, the other slave files or a combination thereof.

1. SYSTEM HARDWARE

Figure 1:
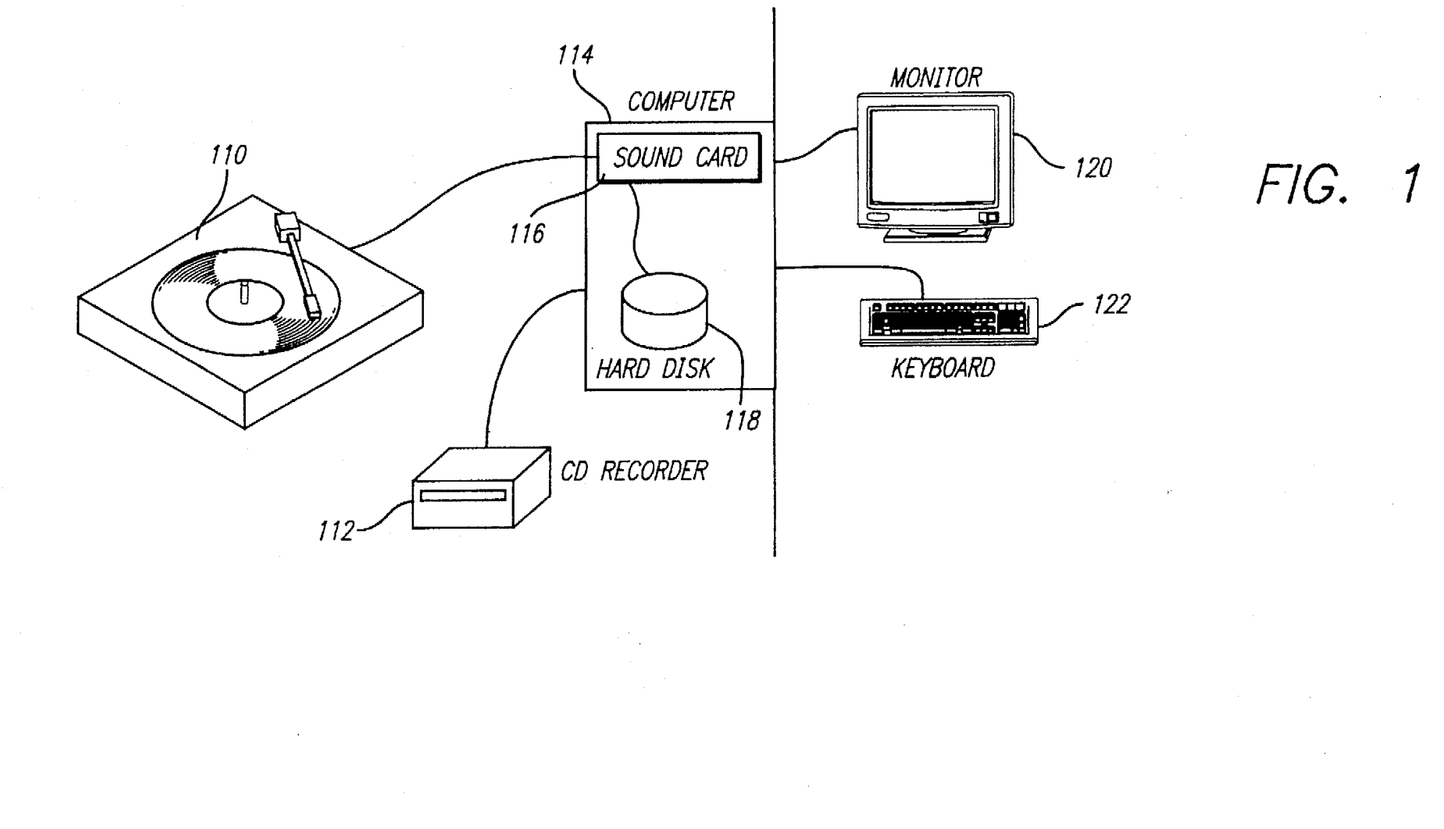
FIG. 1 illustrates a system level block diagram of one embodiment of the apparatus of the present invention.

FIG. 1 illustrates a system level block diagram of the present invention noise reducing system. The output of playback unit 110 is coupled to the input of sound card 116 in computer 114. Sound card 116 is coupled to hard disk drive 118 and compact disc recorder 112 through the bus in computer 114. Computer 114 is also coupled to monitor 120 and keyboard 122.

Figure 5:
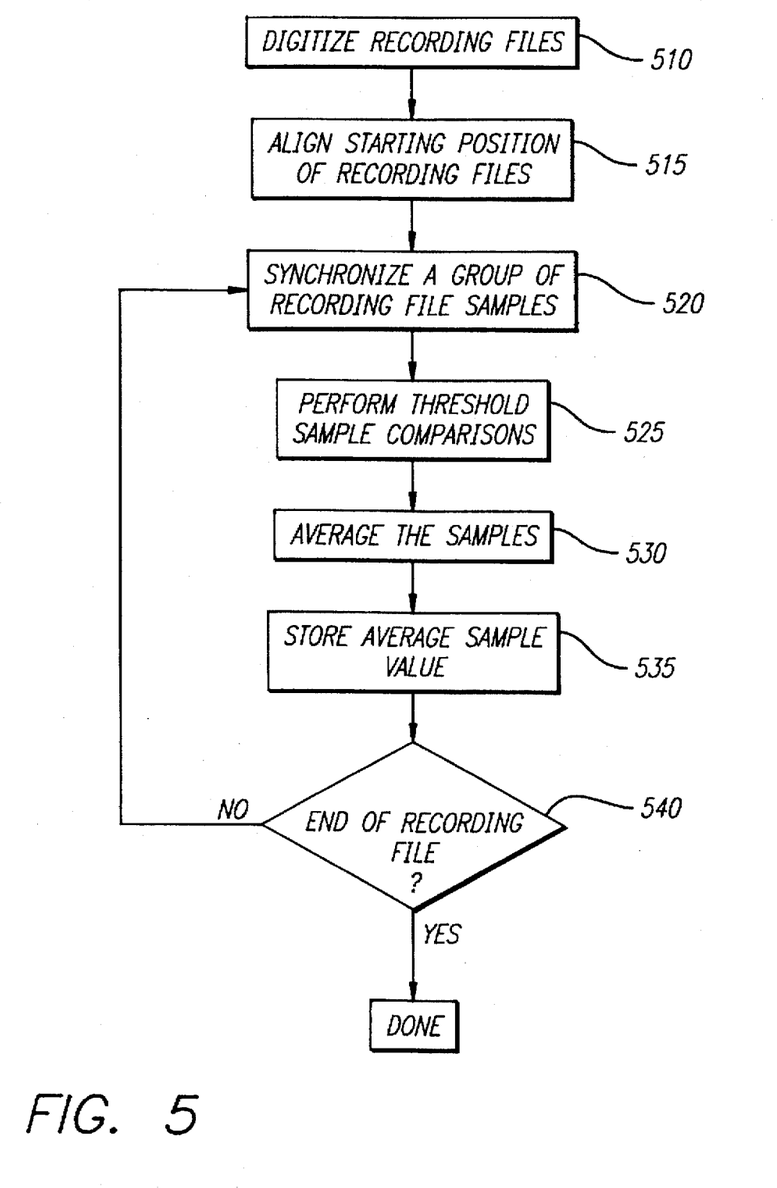
FIG. 5 illustrates a flow chart overview of the noise reduction process of the present invention.

In operation, first a user locates at least two copies of an old recording. FIG. 5 shows a flow chart of the general steps in the noise reduction process. The noise reducing system of the present invention may be used with, for example, several old phonograph-type records. The recordings are then played on playback unit 110. Playback unit 110 may be any apparatus for converting signals stored in a medium into electrical signals. For example, playback unit 110 may be a turntable, reel-to-reel tape player, eight-track tape player, cassette tape player, or compact disc player.

The output signals of playback unit 110 are coupled to sound card 114. Sound card 114 digitizes the signals and creates a file for each of the recording copies. "Recording copies" refers generally to different copies of a recording made from one or more earlier recordings, typically a master recording. For example, five phonograph-type records of a music performance made from the same original master recording of the performance. These recording files are then stored either in hard disk 118 or in CD recorder 112. In place of CD recorder 112, any one of a variety of long term storage devices may be used including, for example, a laser disc recorder or a removable tape cartridge drive. The files are then synchronized and processed by computer 114 to produce a recording with a reduced noise level, and a reduced number of clicks and pops. This improved recording copy may then be used as a master to make more copies, and the recording may be re-released.

2. SIGNALS AND NOISE

Figure 2A:
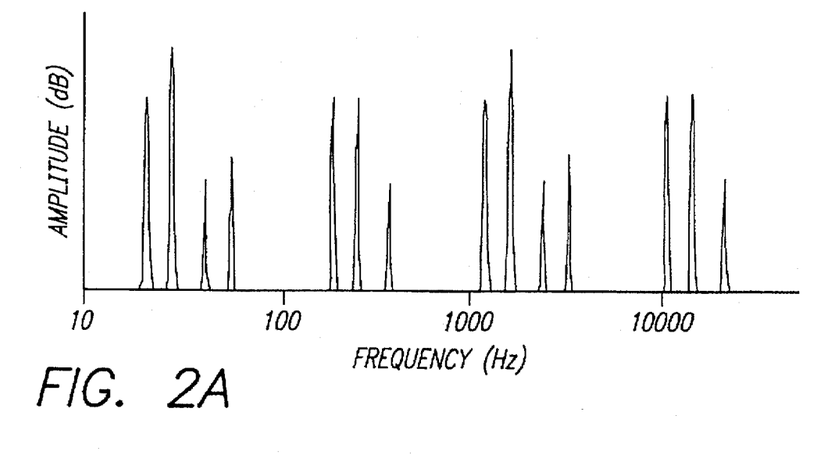
FIG. 2 illustrates a noise free frequency spectrum and a frequency spectrum with noise.

FIG. 2A illustrates an amplitude vs. frequency plot of an ideal recording. In this ideal recording there is no noise or distortion, and there is a linear frequency response throughout the audible range. The absence of any frequency content between the peaks indicates that there is no white noise in the recording.

Figure 2B:
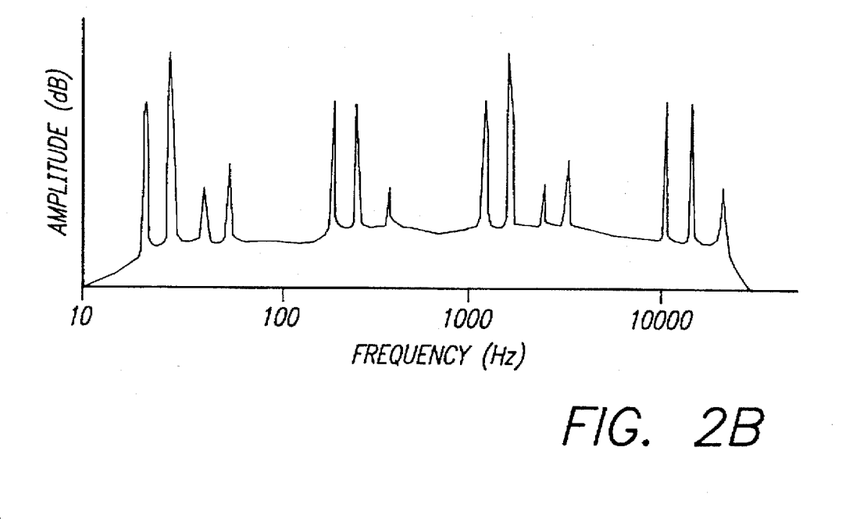

An old analog recording is more likely to appear like FIG. 2B. FIG. 2B illustrates a recording with an undulating noise floor below which the musical signals are lost. The noise floor is that relatively flat frequency content that is interspersed throughout the region for which signals are present. On an old recording some of this noise was likely present on the recording when it was originally produced. This noise component should generally be very similar for each of the recording copies. Other noise components are introduced into individual recording copies due to distortion of the recording medium. For example, noise in old records may be caused by embedded dust, imperfections in the vinyl or other recording medium materials, and through degradation in the recording grooves from playing the recording many times. Similarly, tape recordings are also subject to embedded dust, and degradation of the magnetic medium caused by friction including contact with the roller and playback tape head. This component of the noise varies between different recording copies.

Figure 6:
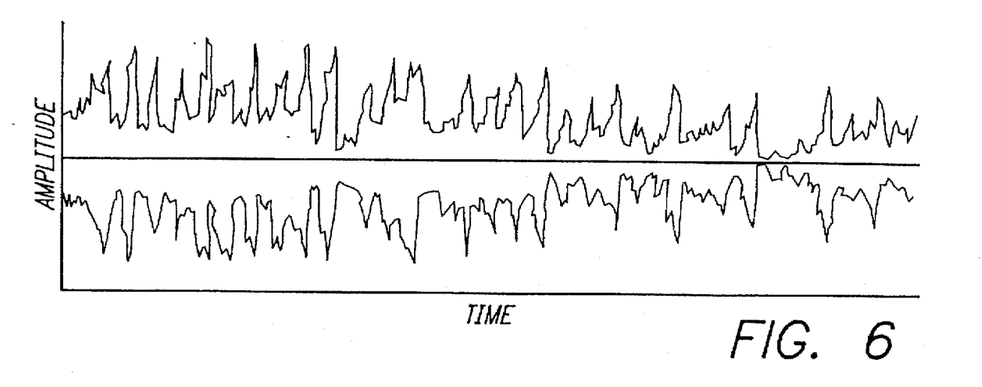
FIG. 6 illustrates a composite time domain plot of a musical recording.

FIG. 6 illustrates a time domain plot of a sample segment from a music recording. The FIG. 6 signal is a composite of all of the different frequency components present in the music. In one embodiment, the present invention performs the noise reduction signal processing steps on a digitized version of the FIG. 6 type signal.

3. NOISE REDUCTION

The noise reduction process comprises several general steps. First the recording copies are digitized into recording files. The recording files are then synchronized. The samples from each of the recording files are then combined to produce a composite value so as to reduce the noise components. For example, in one embodiment an average value is computed. A variety of threshold comparison techniques can be employed to eliminate samples and/or recording files that are outside of a computed range for that sample based on the values of the master, the other slave files or a combination thereof. These processes produce a master recording file with a lower noise level than the recording copies.

a. DIGITIZING

To reduce the noise in recording copies a variety of signal processing operations can be performed. First the recording copies are played on playback unit 110. Playback unit 110 provides an output signal to the input of sound card 116. For example, for a record, a turntable is used for playback unit 110. The turntable converts the contours of the grooves on the record into analog electronic signals which sound card 116 converts into digital data and stores as a recording file in hard disk 118 and or CD recorder 112. The signals are digitized at a high enough frequency to allow computer 114 to shift the recording files in time one sample backward or forward without the change being audible. This minimum recording file resolution ensures that the recording files can be aligned with sufficient accuracy such that the files are temporally aligned to an accuracy well within any difference that a human ear could detect. In one embodiment, an 80 KHz sample rate is used. This provides a sample rate of approximately four times greater than the approximate maximum audible frequency of 20 KHz. Using Nyquist's theorem, an 80 KHz sample rate is sufficient to digitize frequencies up to 40 KHz. The user then repeats this process to digitize and store the remaining recording copies that are available. As will be discussed in more detail below, the more recording copies that are used the more effectively the present invention can reduce noise.

b. SYNCHRONIZING

After the recording copies are digitized, the first step in the noise reduction process is to synchronize the recordings. The computer must compare the same recording segment from each of the recording copies in the noise reduction process in order to accurately reduce the noise and to avoid averaging non-corresponding samples of the recording files. This requires that computer 114 align all of the recording files so that the recordings start at the same time. In one embodiment, the system determines the approximate start time of the music by using a noise profile.

Phonograph-type records generally have unmodulated sections at the start of the record and between songs or movements of the recorded music. The sound level of these unmodulated sections typically is the noise floor, aside from any pops or clicks that may be present. The noise floor of a recording is that level of residual noise present that is not dependent on a musical signal, as is illustrated in FIG. 2B. In one embodiment, computer 114 therefore determines the approximate start of the recorded sound by searching for the first instance of a series of samples in the recording file that exceed a predetermined threshold above the noise floor for a predetermined time longer than an estimated duration of a pop or click. Computer 114 then uses the synchronization processes defined below to align the recording files to the desired accuracy.

Computer 114 should maintain the synchronization of the recording files throughout the noise reduction process to compensate for any drift, wow or flutter that may exist in the different recording files. The term "wow" refers to slow pitch variation in the recorded material. For example, wow can be caused in phonograph-type records by an off-center hole. "Flutter" generally refers to more rapid pitch variation that occurs in sound reproduction as a result of undesired speed variations during the recording, duplicating, or reproducing process. In one embodiment, the recording file alignment in time should be within 25 μS in order to not affect the frequency response of the sound recording when the samples are averaged. The synchronization process is critical and potentially time consuming.

Playback unit 110 should be designed to maximize the accuracy and consistency of the playback speed to facilitate synchronizing the recording files. A turntable that plays back the recording copies at a reduced speed may be used to improve the consistency of the playback speed for the recording files. In one embodiment, computer 114 monitors the playback speed to ensure the speed is maintained within a predetermined range. Approaches to reducing wow and flutter are well known by those of ordinary skill in the art. For example, U.S. Pat. No. 4,286,294, entitled "Recording/Reproducing System" uses a reference frequency to remove varying frequency components caused by wow and flutter, the disclosure of which is hereby incorporated by reference.

To synchronize the recording files, computer 114 or the user selects one recording copy to be a "master" recording. In one embodiment, computer 114 selects the master by selecting the highest quality recording based on a preliminary analysis of the noise level in the recording, for example, the level of white noise, or the number of clicks and pops. Alternatively, a user may select the master recording file based upon, for example, listening to the recording samples to determine which has the best sound quality.

The recording copies are synchronized in blocks of either a predetermined number of samples, for example 2000 samples, or a variable number depending on an analysis of the relative drift of the files. A variety of approaches to synchronizing the recording files may be used. Recording files from different recording copies vary due to the noise component of each recording copy, therefore, computer 114 cannot synchronize the files by looking for an exact match. One statistical approach to synchronizing a slave recording is for computer 114 to measure the standard deviation of the error between the amplitude of the master's samples and the slave's samples over the selected block of samples. Standard deviation is the positive square root of the expected value of the square of the difference between a random variable and its mean. In this case the random variable is the amplitude error, and the mean is zero. The start time of the slave recording relative to the master recording is then shifted, and the standard deviation measurements are repeated. This process of determining a new shift value, measuring the standard deviation for individual samples, and comparing the calculated standard deviations to standard deviations for previous shift values is repeated either a predetermined number of times or until the standard deviation is below a threshold level. The shift value with the minimum standard deviation is then used to align the files.

As is well known by those of ordinary skill in the art, a variety of search algorithms may be used to iteratively change the amount that the slave recording is shifted so as to minimize the standard deviations. One approach is to use predetermined shift values over a certain range. For example, using sample values at ten sample intervals over a range of ±100 samples. This process generates a standard deviation table in which standard deviation varies as a function of time shift values. The time shift corresponding to the minimum standard deviation then correlates to the closest approximation of the shift value required to synchronize the master and slave recordings. The time shift-standard deviation search process may be repeated until the desired level of synchronization is achieved or until the master and slave files are synchronized to within a single sample.

Computer 114 generally keeps the recording files synchronized throughout the noise reduction process. The digitized noise in the recording files may cause spurious variations in the table of standard deviations as a function of time shift value. Computer 114 can take these two factors into account, and use the time shift error from the standard deviation vs. time shift value table as the error term in a digital filter controlling the speed at which the computer moves through the slave file. Computer 114 does not make any large instantaneous adjustments in the alignment of the recording files. Computer 114 monitors the total drift between the master and slave recording files and the standard deviation table to determine if an error has occurred in the noise reduction process. For example, if the system lost synchronization between the master and slave recording files computer 114 would detect large drift values and large standard deviation values. Computer 114 would then implement a corrective procedure, for example, repeating the noise reduction process from the last point where the recording files were known to be synchronized.

Figure 3A:
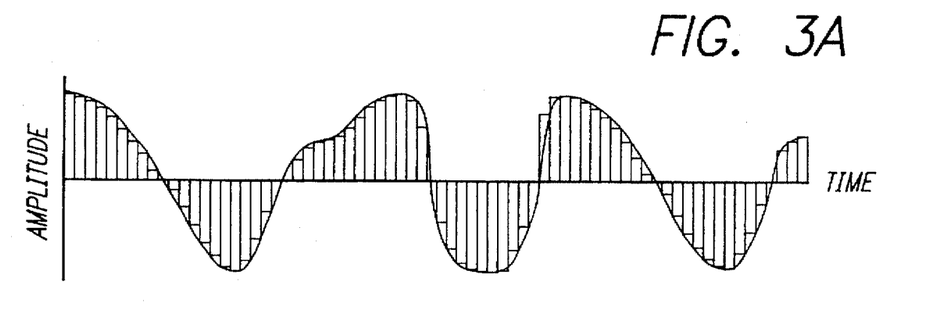
FIG. 3A illustrates the master file.
Figure 3B:
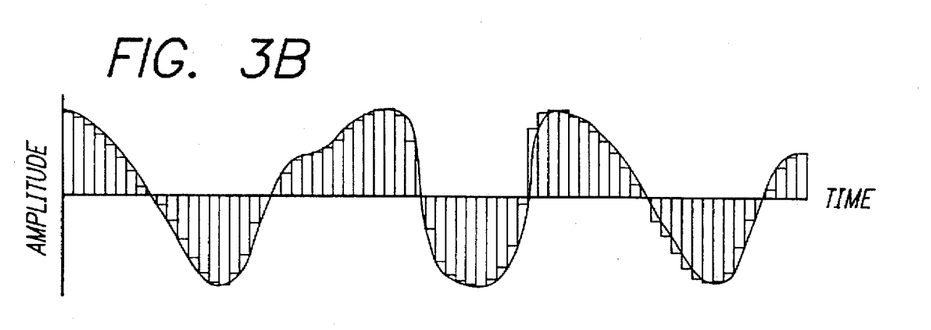
FIG. 3B illustrates the slave file.
Figure 3C:
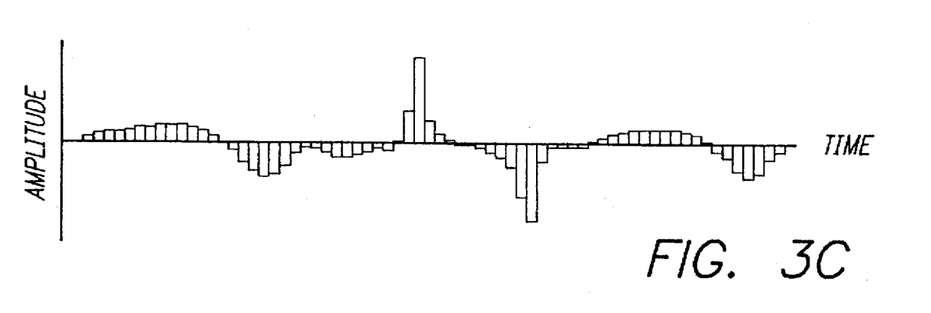
FIG. 3C illustrates the master minus the slave file.
Figure 3D:
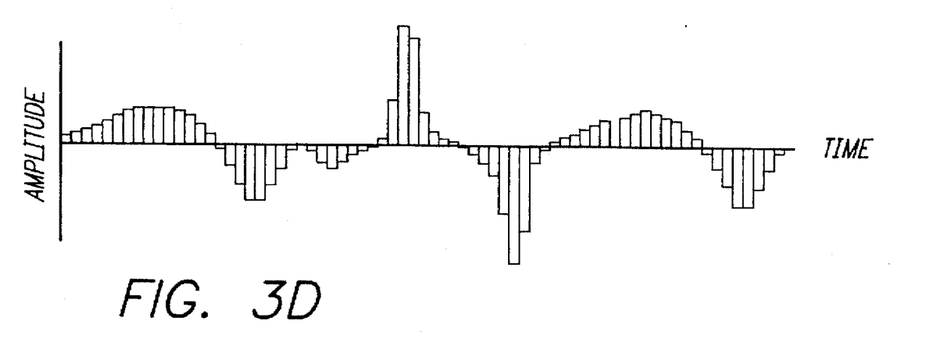
FIG. 3D illustrates the master minus the slave file with an alignment difference of two samples.
Figure 4A:
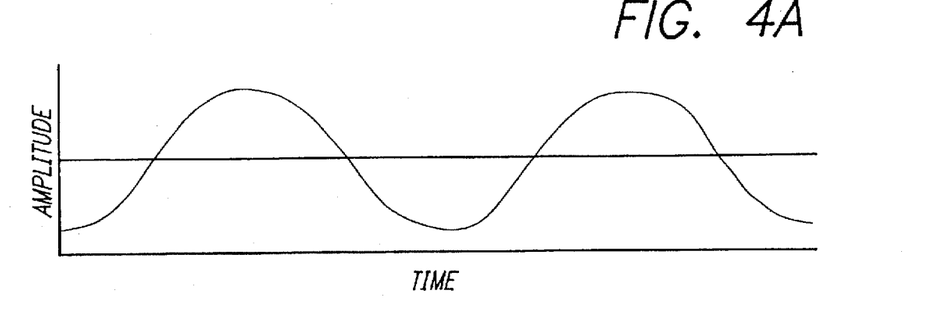
FIG. 4A illustrates an ideal signal.
Figure 4B:
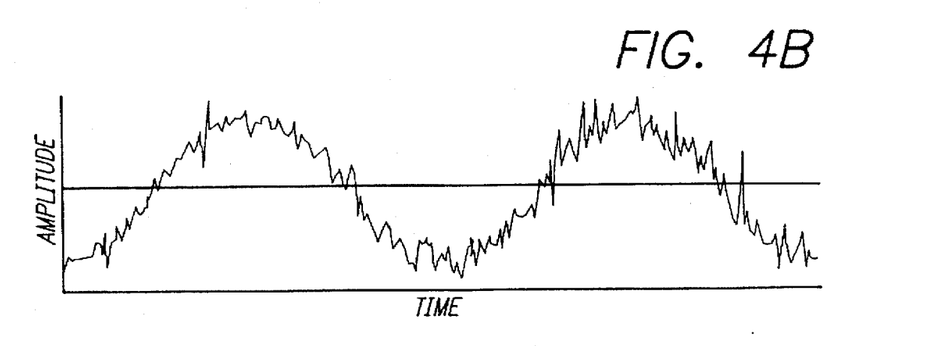
FIG. 4B illustrates a first recording.
Figure 4C:
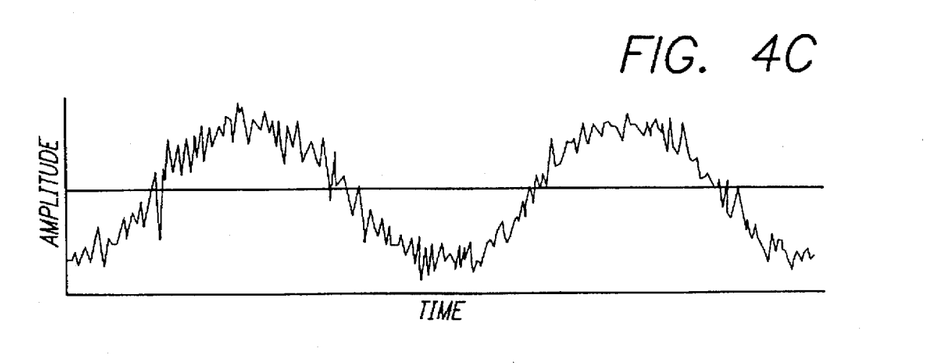
FIG. 4C illustrates a second recording.
Figure 4D:
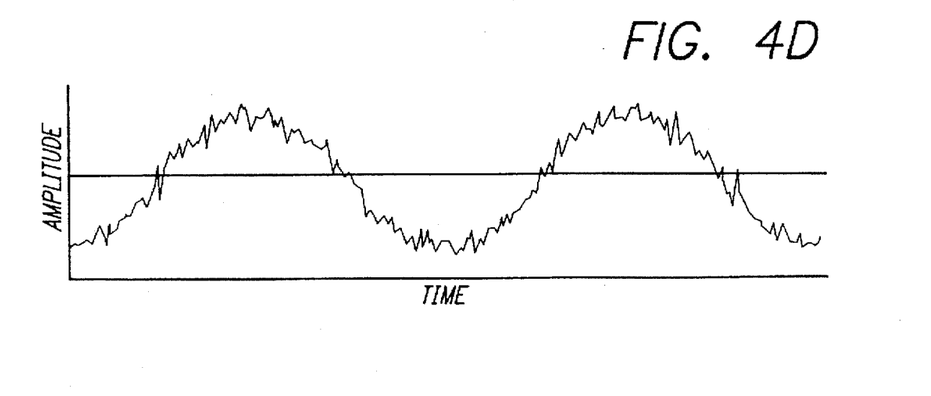
FIG. 4D illustrates an average of the first and second recordings.

The synchronization process is illustrated in part by FIGS. 3A through 3D. FIG. 3A illustrates an analog signal master. The curved line in FIG. 3A represents the original analog signal. The rectangles are the digital samples of the analog signal. FIG. 3B illustrates a segment of the same signal from a slave recording. In this case the slave recording file is one sample ahead of the master recording file shown in FIG. 3A. FIG. 3C illustrates the error between the signals shown in FIGS. 3A and 3B. FIG. 3D illustrates the error between the master and slave recordings if the slave recording of FIG. 3B is shifted another sample ahead of the master in FIG. 3A. Thus, by varying the shift value and measuring the corresponding error between the master and slave files all of the files can be synchronized.

The frequency at which the synchronization process is repeated can also be adjusted according to real time analysis of the number of samples that can be processed before a sample shift error of greater than one sample is detected. For example, if after 100 samples have been processed computer 114 performs the synchronization process and determines that there has not been a significant drift between the files, then computer 114 can increase the number of samples before repeating the synchronization process, for example 110 samples instead of 100. Similarly the number of samples that are processed between synchronization procedures can be decreased as needed where a shift of greater than a predetermined size is detected, for example greater than one sample.

c. SIGNAL PROCESSING

The general principle of the noise reduction processes is that by comparing the different recording copies the musical signals can be distinguished from the noise, and the noise can then be reduced or eliminated. There are a large number of statistical processes that can be used to reduce the noise in a recording using a plurality of recording copies, including: averaging, calculating median values, calculating standard deviations, and performing threshold comparisons.

i. AVERAGING

One embodiment of the noise reducing system of the present invention uses an averaging process to reduce the level of white noise. Generally plotting a large number of measurements of a single quantity subject to comparatively low level random noise produces a group of values that form a bell curve, with the noise free value of that quantity at the center of the bell curve. Therefore for random noise in the recording files, the corresponding sample values from a sufficient number of recording files should also form a bell curve. White noise is random noise that has a constant energy per unit bandwidth at every frequency in the range of interest. Because white noise is random, the phase of the noise in different recording files at any given sample location is likely to be different. Computer 114 uses this phase difference between the noise components of corresponding samples in different recording files to reduce the noise level by averaging the signals.

The averaging process is illustrated in FIG. 4. FIG. 4A illustrates an amplitude vs. time plot for an ideal recording. To clearly distinguish the signal from noise, a signal comprising a single frequency is illustrated. FIG. 4B illustrates an example of a noisy recording copy of the same signal. FIG. 4C illustrates a second recording copy of the same signal. FIGS. 4A and 4B illustrate a typical case where the noise levels on the signals are of comparable peak-to-peak amplitude but have different phases. Therefore, generally at any given time the amplitudes of the noise signals are different. FIG. 4D illustrates an average of the signals in FIGS. 4B and 4C. Averaging the noise signals generally reduces the noise level as FIG. 4D illustrates. The reduction in noise level is based on the fact that random noise is centered around the original signal. When a plurality of recording files are averaged the positive and negative deviations from the original signal in the synchronized samples of the different corresponding files at least partially cancel each other out. The resultant signal converges on the original signal as the number of independent recording files included in the averaging process is increased.

ii. ENHANCEMENTS

Numerous enhancements may be made to the averaging process to further improve noise reduction. One such enhancement is a threshold level comparison step. In one embodiment, as a preliminary step, the system eliminates recording files that have unacceptably poor sound quality relative to the other recording files. At the start of the averaging process for a given sample, computer 114 obtains the value of the selected sample from each of the recording files. Computer 114 then calculates the average of those values. Computer 114 may next eliminate sample values that exceed a predetermined threshold difference from the average value. Alternatively, computer 114 may eliminate the sample, or a predetermined number of recording samples, that differ the most from the average. For example, for each set of corresponding samples, the highest and lowest values can be discarded, under the theory that they deviate so much from the average value that they are not representative of the original sound value. In one embodiment, where there is a large number of recording files, for example over ten, computer 114 determines the threshold by calculating the standard deviation of the error between each recording sample and the average signal level. Computer 114 then eliminates the recording file samples with an error greater than a predetermined multiple of the standard deviation.

Alternatively, computer 114 may eliminate unacceptably noisy recording files based on the standard deviation of the difference between the master and slave samples. In the synchronization process, computer 114 calculates the standard deviation between the master and the slave recording files. The sum of the standard deviations for each sample, calculated at the time shift value that produced the minimum total standard deviation, is an indication of the noise differential between the master and slave recording files. Thus, computer 114 may eliminate recording files whose minimum total standard deviation exceeds the minimum total standard deviation of the other slave recording files by a predetermined multiple of the standard deviation. In a further alternative, computer 114 may eliminate individual samples where they differ by greater than a predetermined amount from the corresponding master sample value. Similarly, where a sample or group of samples is determined to be sufficiently noise and distortion free this sample or group of samples can be transferred directly into the output file.

In another enhancement to the averaging process, computer 114 approximates the signal-to-noise ratio based on general properties of white noise, pops and clicks. Computer 114 may then eliminate any recording files that have a signal-to-noise ratio below a given threshold.

Also if samples from particular recording files are repeatedly found to have unacceptably high noise levels, computer 114 may eliminate the entire recording file from the process. Eliminating an entire recording file increases the speed of the noise reduction process, and where there are a sufficient number of superior recording files eliminating distinctly inferior recording files further reduces the noise level in the final output recording file.

A further enhancement to the averaging process is eliminating a predetermined number of samples after a pop or click is detected. A parameter is defined that approximates the duration of a pop or click. This parameter can be set to a default value generally representative of pops and clicks. Alternatively, a particular recording file could be characterized to evaluate the typical duration of signal features that exceed a threshold maximum value associated with the music signal. In the averaging process when a value is detected that exceeds a pop or click threshold level then the following samples up to the predefined duration are deleted irrespective of the value of the subsequent samples. The subsequent samples are deleted on the theory that even if their values are less than the threshold value the signal is likely to be due to some dust or other contaminant on the disc than it is to be due to a musical signal.

This process of eliminating recording file samples based on variations between recording file sample values reduces pops and clicks as well as white noise. In contrast to prior art pop and click removal systems, the present invention noise reducing system avoids the problem of losing musical content when a pop or click is eliminated because the present invention uses the samples from the other recording copies for the output file, in place of the recording file samples corrupted by pop and click noise. The pops and clicks generally occur at different times on different copies of a single original recording. This is caused in part by differences in the distribution of dust and other undesired particles that have become embedded into the recording medium, for example a vinyl type record. Therefore the samples dominated by pop or click noise can be eliminated and replaced with the result of the noise reduction process performed on the corresponding samples from the other recording files.

The noise reduction process may be further enhanced by selectively applying the above techniques. In one embodiment, computer 114 evaluates the distribution of the samples representing the same time interval in each of the recording files. Based on the distribution of these samples computer 114 determines which signal processing techniques should be applied for this group of samples. For example, where all of the sample values are within a certain predetermined range, computer 114 may not eliminate any of the samples. Similarly, where a large number of samples are within a small range of values and a substantially smaller group of samples vary widely, computer 114 may process the samples based on a mode value approach rather than an average of the values, where the mode value is defined as the most frequently occurring value, or range of values, of the set of samples. Using the mode value eliminates the distorting effect of sample values that widely differ from the apparent original value as indicated by a large group of samples distributed about a particular value.

In monophonic phonograph-type recordings both sides of the recording grooves ideally form the same contours, and represent the same musical signals. Stereo turntables read the inside and outside contours of a recording groove as separate channels. Therefore, if a stereo turntable is used for playback unit 110, the number of recording files can effectively be doubled. Any samples of clicks and pops in these recording files can be replaced with the corresponding click or pop free samples from the other channel. The channel with the click or pop is identified using the techniques described above.

iii. POPS AND CLICKS ON A MASTER RECORDING

The present invention noise reduction process may also serve as a process to prepare recordings for conventional pop and click removal techniques that operate on only a single recording copy. Furthermore, digital equivalents of conventional pop and click removal techniques can be incorporated into the present invention. Applying the present invention to reduce the noise content of the recording copies enables the pop and click removal techniques to be more effective because the pops and clicks are more clearly defined when the noise is reduced. Conventional pop and click removal techniques that operate on a single recording copy may be particularly useful for eliminating pops and clicks that were present on a no longer available original master. Pops and clicks present on the original master are likely also to be present on all of the recording copies.

d. DIRECTION OF PLAYBACK

Playing recording media in a direction other than the direction typically used to play the recording can produce a higher quality output signal. In one embodiment, phonograph-type records are played backwards during the digitization process. Playing the phonograph-type records using the reverse rotational direction favors the side of the groove that has been exposed to less resistance over the life of the record, as opposed to the side of the groove that is exposed to greater pressure when the record is being played in the forward direction. The technique of playing recording media in the reverse direction can also be applied to recordings on tape media.

Thus a method and apparatus for reducing noise using a plurality of recording copies have been described. Although the present invention has been described with respect to certain specific embodiments, it will be clear to those skilled in the art that the inventive features of the present invention are applicable to other embodiments as well, all of which are intended to fall within the scope of the present invention.

I claim:

1. An apparatus for reducing noise in a recording comprising:

a means for digitizing a plurality of copies of said recording to form digital recording files, wherein said recording files comprise a plurality of samples;

a synchronizing means for synchronizing said recording files;

a computing means for computing a composite value for corresponding samples in said recording files;

a compiling means for compiling an output recording file comprised of said composite values.

2. A method for reducing noise in a sound recording comprising the steps of:

digitizing a plurality of copies of the sound recording to form digital recording files, wherein the recording files comprise a plurality of samples;

synchronizing the recording files;

computing a composite value for corresponding samples in the recording files, and compiling an output recording file comprised of said composite values.

3. The method of claim 2 wherein said step of computing a composite value further comprises computing an average value for corresponding samples in the recording files, and compiling an output recording file comprised of said average values.

4. The method of claim 3 wherein said step of computing an average value for corresponding samples in the recording files, and compiling an output recording file comprised of said average values further comprises:

computing a preliminary average value of said corresponding samples;

computing the standard deviation of the difference between each of said corresponding samples and the corresponding preliminary average value;

eliminating those samples that deviate from said average value by greater than a predetermined multiple of standard deviations;

computing said average value for the corresponding samples excluding the eliminated samples; and storing said average value in said output recording file.

5. The method of claim 4 wherein said step of eliminating those samples that deviate from said average value by greater than a predetermined multiple of standard deviations further comprises eliminating those recording files from which a predetermined number of samples have been eliminated.

6. The method of claim 3 wherein said step of computing an average value for corresponding samples in the recording files, and compiling an output recording file comprised of said average values further comprises:

selecting one of the recording files to be a master file;

computing the standard deviation of the difference between each of said samples and the corresponding master sample value;

eliminating those samples that deviate from said master sample value by greater than a predetermined multiple of standard deviations;

computing said average value for the corresponding samples excluding the eliminated samples; and storing said average value in said output recording file.

7. The method of claim 3 wherein said step of computing an average value for corresponding samples in the recording files, and compiling an output recording file comprised of said average values further comprises:

computing a preliminary average value of said corresponding samples;

eliminating samples that differ by greater than a predetermined percentage from said preliminary average value;

computing said average value for the corresponding samples excluding the eliminated samples; and storing said average value in said output recording file.

8. The method of claim 3 wherein said step of computing an average value for corresponding samples in the recording files, and compiling an output recording file comprised of said average values further comprises:

computing a preliminary average value of said corresponding samples;

eliminating a predetermined percentage of the samples which differ the most from said preliminary average value;

computing said average value for the corresponding samples excluding the eliminated samples; and storing said average value in said output recording file.

9. The method of claim 3 wherein said step of computing an average value for corresponding samples in the recording files, and compiling an output recording file comprised of said average values further comprises:

computing a signal-to-noise ratio for each of the recording files based upon predetermined signal and noise characteristics;

eliminating those files that have a signal-to-noise ratio below a predetermined threshold level;

computing said average value for the corresponding samples excluding the eliminated files; and storing said average value in said output recording file.

10. The method of claim 3 wherein said step of computing an average value for corresponding samples in the recording files, and compiling an output recording file comprised of said average values further comprises:

computing a weighted average for the corresponding samples in the recording files.

11. The method of claim 10 wherein said step of computing a weighted average further comprises varying the weights in an inverse relationship to the number of standard deviations that each of the corresponding samples differs from the mean.

12. The method of claim 2 wherein said step of digitizing a plurality of copies of the sound recording to form digital recording files further comprises:

digitizing a phonograph-type record having a left contour and a right contour in the recording groove, wherein said left contour track is digitized to form a left contour recording file, and said right contour track is digitized to form a right contour recording file;

identifying samples in said left contour and said right contour that exceed a predetermined threshold noise level;

replacing said samples that exceed a predetermined threshold noise level from said left contour recording file with corresponding samples from said right contour recording file;

replacing said samples that exceed a predetermined threshold noise level from said right contour recording file with corresponding samples from said left contour recording file.

13. The method of claim 2 wherein said step of digitizing a plurality of copies of the sound recording to form digital recording files further comprises digitizing the sound recording copies at a playback speed slower than the speed at which they are played back for listening purposes.

14. The method of claim 2 wherein said step of synchronizing the recording files further comprises:

selecting one of the recording files as a master file;

selecting one of the remaining recording files as a slave file;

computing the standard deviation of the differences between the values of a group of master file samples and the values of the corresponding samples in the slave file;

shifting the slave file in time relative to the master file;

computing the standard deviation of the difference between the values of a group of master file samples and the values of the corresponding samples in the slave file;

repeating the above computing a standard deviation and shifting steps a predetermined number of times;

selecting the shift value which minimizes the standard deviation of the difference between the values of a group of master file samples and the values of the corresponding samples in the slave file.

15. The method of claim 2 wherein said step of digitizing a plurality of copies of the sound recording to form digital recording files further comprises digitizing phonograph-type records.

16. The method of claim 15 wherein said step of digitizing a plurality of copies of the sound recording to form recording files, further comprises playing the sound recording in a direction other than the direction it is played in for listening purposes.

17. The method of claim 2 wherein said step of digitizing a plurality of copies of the sound recording to form digital recording files further comprises digitizing recordings on tape.

18. The method of claim 17 wherein said step of digitizing a plurality of copies of the sound recording to form recording flies, further comprises playing the sound recording in a direction other than the direction it is played in for listening purposes.

19. A method for reducing noise in a sound recording comprising the steps of:

digitizing a plurality of copies of the sound recording to form digital recording files, wherein the recording files comprise a plurality of samples;

synchronizing the recording files;

determining whether a predetermined percentage of a group of corresponding samples are within a predetermined range;

calculating a mode value of said corresponding samples, and storing said mode value in an output file if a predetermined percentage of said corresponding samples are not within a predetermined range; and calculating an average value of said corresponding samples, and storing said average value in an output file if a predetermined percentage of said corresponding samples are within a predetermined range.

20. The method of claim 19 wherein said steps of:

determining whether a predetermined percentage of a group of corresponding samples are within a predetermined range;

calculating a mode value of said corresponding samples, and storing said mode value in an output file if a predetermined percentage of said corresponding samples are not within a predetermined range; and calculating an average value of said corresponding samples, and storing said average value in an output file if a predetermined percentage of said corresponding samples are within a predetermined range;

are performed at predetermined intervals throughout the noise reducing process.

21. The method of claim 19 wherein said step of digitizing a plurality of copies of the sound recording to form digital recording files further comprises:

digitizing a phonograph-type record having a left contour and a right contour in the recording groove, wherein said left contour track is digitized to form a left contour recording file, and said right contour track is digitized to form a right contour recording file;

identifying samples in said left contour and said right contour that exceed a predetermined threshold noise level;

replacing said samples that exceed a predetermined threshold noise level from said left contour recording file with corresponding samples from said right contour recording file;

replacing said samples that exceed a predetermined threshold noise level from said right contour recording file with corresponding samples from said left contour recording file.

22. The method of claim 19 wherein said step of digitizing a plurality of copies of the sound recording to form digital recording files further comprises digitizing the sound recording copies at a playback speed slower than the speed at which they are played back for listening purposes.

23. The method of claim 19 wherein said step of synchronizing the recording files further comprises:

selecting one of the recording files as a master file;

selecting one of the remaining recording files as a slave file;

computing the standard deviation of the differences between the values of a group of master file samples and the values of the corresponding samples in the slave file;

shifting the slave file in time relative to the master file;

computing the standard deviation of the difference between the values of a group of master file samples and the values of the corresponding samples in the slave file;

repeating the above computing a standard deviation and shifting steps a predetermined number of times;

selecting the shift value which minimizes the standard deviation of the difference between the values of a group of master file samples and the values of the corresponding samples in the slave file.

24. The method of claim 19 wherein said step of digitizing a plurality of copies of the sound recording to form digital recording files further comprises digitizing phonograph-type records.

25. The method of claim 24 wherein said step of digitizing a plurality of copies of the sound recording to form recording files, further comprises playing the sound recording in a direction other than the direction it is played in for listening purposes.

26. The method of claim 19 wherein said step of digitizing a plurality of copies of the sound recording to form digital recording files further comprises digitizing recordings on tape.

27. The method of claim 26 wherein said step of digitizing a plurality of copies of the sound recording to form recording files, further comprises playing the sound recording in a direction other than the direction it is played in for listening purposes.

* * * * *